Sept. 27, 1955     A. S. DUDLEY     2,718,845
BARBECUE UNIT

Filed Aug. 4, 1952     2 Sheets-Sheet 1

INVENTOR
ARTHUR S. DUDLEY
BY
Webster & Webster
ATTY'S.

Sept. 27, 1955    A. S. DUDLEY    2,718,845
BARBECUE UNIT
Filed Aug. 4, 1952    2 Sheets-Sheet 2

INVENTOR
ARTHUR S. DUDLEY
BY
Webster & Webster
ATTY'S.

United States Patent Office 2,718,845
Patented Sept. 27, 1955

2,718,845
BARBECUE UNIT
Arthur S. Dudley, Sacramento, Calif.
Application August 4, 1952, Serial No. 302,577
3 Claims. (Cl. 99—421)

This invention relates in general to an improved barbecue unit for cooking of foods outdoors, as on a patio, in a garden, on picnics, or the like.

A major object of the present invention is to provide a barbecue unit which is especially adapted for dual purpose use; i. e. for barbecue cooking of food, such as a roast or fowl, on a spit, with the bed of coals confined vertically to the rear of the spit, or for barbecue cooking of steaks, chops, or the like on a horizontal grill with the bed of coals therebeneath.

An additional object of the invention is to provide a barbecue unit which is constructed for ready manual adjustment to dispose the parts of the structure in proper position for either type of cooking.

Another object of the invention is to provide a barbecue unit, as in the preceding paragraphs, which includes a grill and a firebox in novel combination; the firebox being in a form, and supported in a manner, to effectively carry the bed of coals in proper relation to the grill when the bed of coals is horizontal. The grill cooperates with the firebox in a novel manner to aid in the retention of the bed of coals when the latter is vertically disposed for cooking of food on the spit.

A further object of the invention is to mount the firebox in a manner such that adequate draft to the bed of coals is assured in either position of use.

It is also an object of the invention to provide a barbecue unit which is designed for ease and economy of manufacture; such unit being readily portable from place to place and convenient to use.

Still another object of the invention is to provide a practical and reliable barbecue unit, and one which will be exceedingly effective for the purpose for which it is designed.

These objects are accomplished by means of such structure and relative arrangement of parts as will fully appear by a perusal of the following specification and claims.

Figure 1:
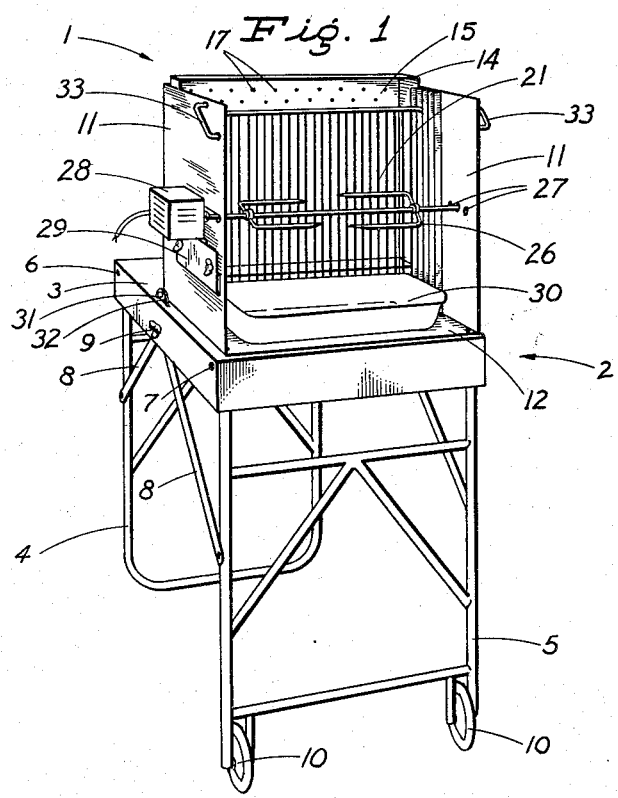
Fig. 1 is a perspective view of the barbecue unit with the parts in the positions occupied thereby for cooking of food on the spit with the bed of coals disposed vertically.

Referring now more particularly to the characters of reference on the drawings, the barbecue unit, indicated generally at 1, is supported on a push-stand or table, indicated generally at 2.

The table 2 includes a top 3, and folding legs 4 and 5 are pivoted, as at 6 and 7, to opposite ends of the table top 3 for folding from a depending position of use upwardly against the bottom of the table top 3; such table including depending side skirts, as shown, and which in effect form a pocket for the reception of the legs 4 and 5.

The legs 4 and 5 are normally prevented against folding by diagonal braces 8 which extend upwardly on each side of the table top 3 to detachable connection therewith by means of wing nuts and bolts, as at 9.

The leg 4, when in use, rests directly on the ground, while the leg 5 is fitted with wheels 10 so that the table 2 may be readily moved from place to place.

The table top 3—while rectangular in plan—is elongated, being approximately twice as long as it is wide.

The barbecue unit 1, which is initially separate from the table 2, is supported on the table top 3 as will hereinafter appear.

Figure 2:
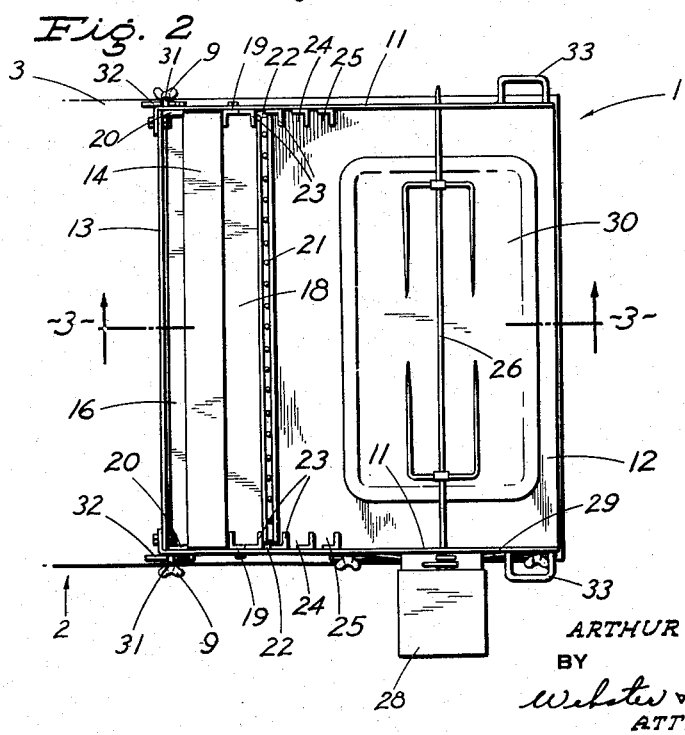
Fig. 2 is an enlarged top plan view of the same.
Figure 3:
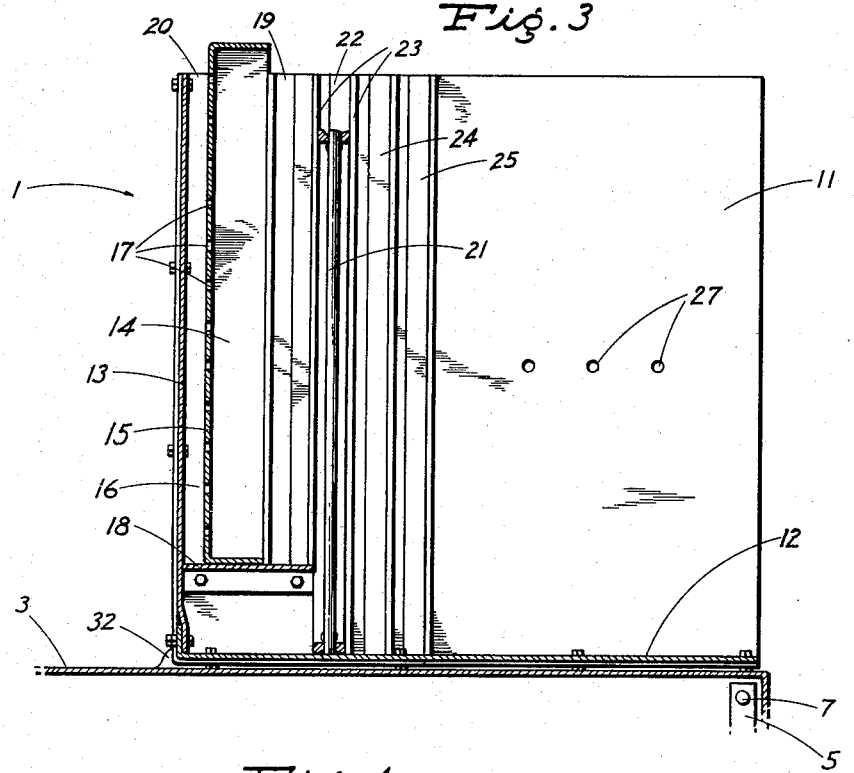
Fig. 3 is a cross sectional elevation on line 3—3 of Fig. 2; the view being somewhat enlarged.

Such barbecue unit 1 will first be described, in its structural details, by reference to its position of use for cooking of foods on a spit, with the bed of coals disposed rearwardly of such spit, as shown in Figs. 1–3 inclusive.

The barbecue unit or cooking enclosure 1 comprises rectangular side walls 11 connected together at the bottom by a rectangular base plate 12, and connected at the rear by a rectangular back wall 14; the unit being open at the top and front. The side walls 11, base plate 12, and back wall 13 may be secured together by a flange and bolt assembly, as shown, or by welding.

A forwardly opening, but relatively shallow, rectangular, pan-like firebox 14 is disposed vertically in the barbecue unit 1 in adjacent but spaced relation to the back wall 13; the space between the bottom 15 of the firebox and the back wall 13 providing a flue or chimney 16. The bottom 15 of the firebox has a multiplicity of perforations 17 therethrough.

The firebox 14 is supported from below, and some distance above, the base plate 12, by a transverse shelf 18, which shelf is somewhat wider than the depth of such firebox, extending from the back wall 13 to a point forwardly of said firebox 14. The shelf 18 is of a length such that it may be secured at opposite ends to the corresponding side walls 11.

When the firebox 14 is supported on the transverse shelf 18, the upper end portion of such firebox projects somewhat above the upper edges of the side walls 11 for convenience of manual access.

The firebox 14 is maintained in position by abutment, at the front side edges, with vertical angle irons 19 affixed to the side walls 11, and by abutment at the rear side edges against spacer bars 20 affixed to the side walls directly ahead of the back wall 13.

As so mounted, the firebox 14 is effectively maintained in its vertical position, but can be readily manually withdrawn for filling with barbecue fire material, such as charcoal.

Directly ahead of the firebox 14 and transverse shelf 18 there is a vertically disposed rectangular grill 21 guided at the side edges in opposed channels 22 formed by angle irons 23 affixed to the side walls 11, as shown. Other opposed channels 24 and 25 are similarly formed on the side walls 11 ahead of the channels 22 for the purpose hereinafter described. Ease of manual access to the outer projecting end of the firebox is enhanced by the fact that the grate 21 terminates short of the edges of the sidewalls, as shown in Fig. 3, so that a greater unobstructed space is left between the projecting end of the firebox and the adjacent end of the grill, even when the latter is set close to the firebox.

A distance above the base plate 12, and ahead of the grill 21, the barbecue unit includes a horizontal, transversely extending spit 26 which projects at opposite end portions through selected ones of horizontal rows of holes 27 in the side walls 11; this arrangement making possible the adjustment of the spit 26 toward, or away from, the grill 21.

The spit 26 may be turned by hand by means of a crank (not shown), or may be power driven by an electric motor and reduction gear unit 28 connected to said spit 26 exteriorly of one of the side walls 11. The electric motor and reduction gear unit is adjustably secured to the related side wall 11 by a clamping assembly indicated generally at 29; the adjustment being forward or rearward whereby to match the spit 26 regardless of the holes 27 in which said spit is set.

A drip pan 30 is disposed on the base plate 12 directly below the spit 26.

The barbecue unit 1, in its position of use as in Figs. 1–3 inclusive rests with the base plate 12 on one half of the table top 3, with such barbecue unit opening endwise of the table 2.

At its rear lower corners the barbecue unit 1 includes trunnions 31 which project laterally and seat, in removable relation, in cradles 32 which upstand from the table top 3 adjacent its sides and centrally of its ends. The purpose of this arrangement will hereinafter appear.

Handles 33 project outwardly from the forward upper corners of the side walls 11, for manipulation of the barbecue unit 1.

The described barbecue unit, when disposed as in Figs. 1–3 inclusive, is used as follows:

A vertical bed of coals is retained in the firebox 14 by the grill 21; the heat from such bed of coals radiating forwardly through said grill to cook the food carried on the spit 26. The juices from the cooking food drip into the pan 20, from which they can be used for basting of the food or for making gravy or sauce.

By reason of the perforations 17 in the bottom 15 of the firebox 14, the bed of coals has adequate draft, which draft is maintained by reason of the flue 16 formed between the firebox and the back wall 13.

Figure 4:
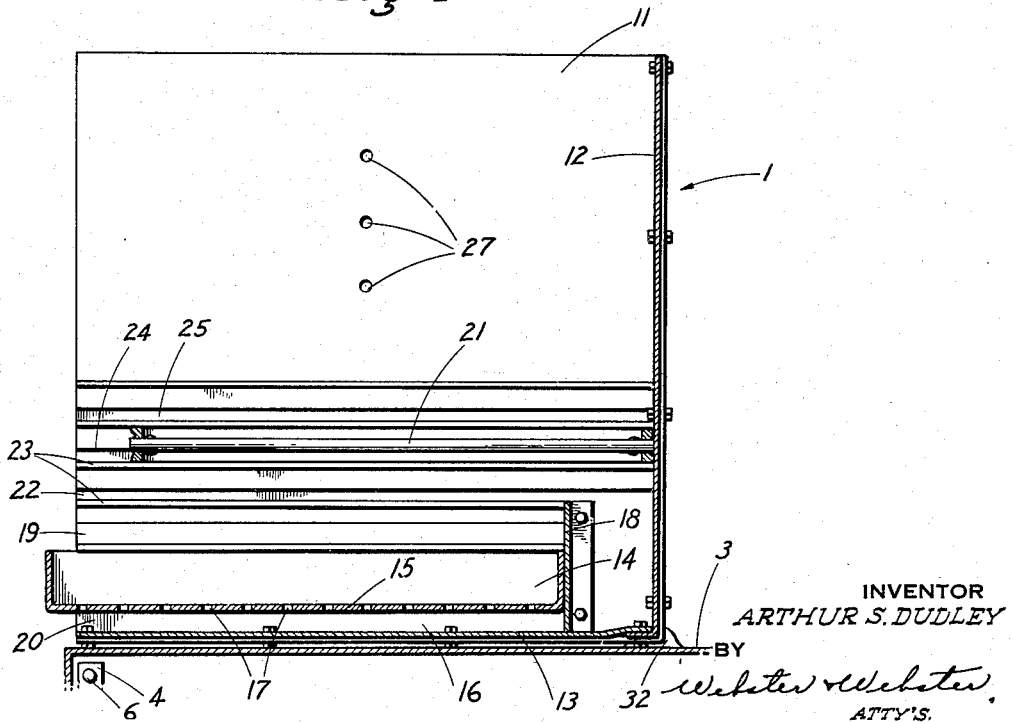
Fig. 4 is a cross sectional elevation similar to Fig. 3, but shows the device as adjusted to a position for cooking of foods on the then horizontal grill, with the firebox and bed of coals beneath such grill.

When it is desired to use the barbecue unit 1 for the cooking of steaks, chops, or the like on a horizontal grill, the handles 32 are grasped and the barbecue unit 1 is swung about the trunnions 31 as an axis, from the position of Figs. 1–3 inclusive to the position of Fig. 4. This movement of 90° disposes the back wall 13 on the opposite half of the table top 3, whence the firebox 14 is disposed horizontally below the then horizontal grill 21. By this simple manipulation the barbecue is converted or adjusted for horizontal grill cooking. This adjustment can be made with a bed of live coals in the firebox 14, so that the barbecue unit can be used first for one type of cooking, and then immediately for the other.

Before the barbecue unit is adjusted for horizontal grill cooking, the electric motor and gear unit 28, as well as the spit 26, are removed.

When the barbecue unit 1 is set for horizontal grill cooking, as in Fig. 4, the flue 16—previously vertical— now becomes horizontal and serves as the air entry passage for the air which passes upwardly through perforations 17 to maintain the bed of coals live.

When the barbecue unit 1 is used for cooking of food on the spit 26, the distance between the food and the bed of coals in the firebox 14 may be varied by adjustment of the spit 26 in the holes 27 in side walls 11.

When the unit 1 is set for horizontal grill cooking, the distance between the bed of coals in the firebox 14 and the food on the grill 21 may be varied by adjusting such grill; i. e. from the channels 22 to the channels 24 or 25.

The foregoing portable barbecue unit, while being of relatively simple structure, capable of manufacture economically, is convenient and practical for dual-purpose barbecue cooking, as described.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A barbecue unit comprising a horizontal support having an elongated flat top, a housing resting on said top and having opposed sidewalls and a pair of transverse walls disposed in adjacent right-angle relationship to each other and connected to the adjacent side edges of the sidewalls and leaving the other sides of the housing open, the sidewalls extending to the outer edges of said transverse walls, a grill supported from and extending the full distance between the sidewalls substantially parallel to and spaced from one transverse wall, a pan-like firebox mounted in the housing between the grill and said one wall and extending the full distance between said sidewalls, means to support food to be cooked from the sidewalls in front of the grill, and means hinging the housing at the junction of the transverse walls on said flat top transversely and substantially centrally of the length thereof for rotation of the housing on the support between a vertical position of the firebox and a horizontal position of the same; the length of the sidewalls, from the hinge means to the outer ends of said walls, being substantially one-half the length of the flat top.

2. In a portable barbecue, a support, a cooking enclosure on the support and comprising a rectangular bottom plate, a rectangular back plate disposed at right angles to the bottom plate and projecting from the back edge thereof, substantially rectangular sidewalls upstanding from and connecting the side-edges of the bottom and back plates, a firebox and grill unit extending between the sidewalls in parallel and spaced relation to the bottom plate, means hinging the enclosure on the support at the junction of the bottom and back plates for movement between vertical and horizontal positions of the bottom plate, and a spit supported between the sidewalls substantially centrally of the area of the portion thereof disposed between the grill and the outer edges of the sidewalls.

3. In a barbecue unit which includes a support, a cooking enclosure mounted on the support and including a bottom plate and sidewalls, means hinging the enclosure on the support for movement of the bottom plate between horizontal and vertical positions, a firebox disposed between the sidewalls adjacent but spaced from the bottom plate, a grill extending the full distance between the sidewalls in substantially parallel and relatively closely spaced relation to the firebox, and instrumentalities secured on the sidewalls and forming channels in which the firebox and grill are separately slidably and removably located.

References Cited in the file of this patent

UNITED STATES PATENTS

| | | |
|---|---|---|
| 706,502 | VanWie | Aug. 5, 1902 |
| 1,554,645 | Morris | Sept. 22, 1925 |
| 1,605,143 | Renfroe | Nov. 2, 1926 |
| 1,836,894 | Bedigian | Dec. 15, 1931 |
| 2,307,914 | Bitney | Jan. 12, 1943 |
| 2,379,239 | Krebs | June 26, 1945 |
| 2,398,508 | Shoemaker | Apr. 16, 1946 |
| 2,441,190 | Fuller | May 11, 1948 |
| 2,559,710 | Danielsen | July 10, 1951 |
| 2,573,988 | Saltzberg | Nov. 6, 1951 |
| 2,659,360 | Bitney | Nov. 17, 1953 |